Figures 1, 5:
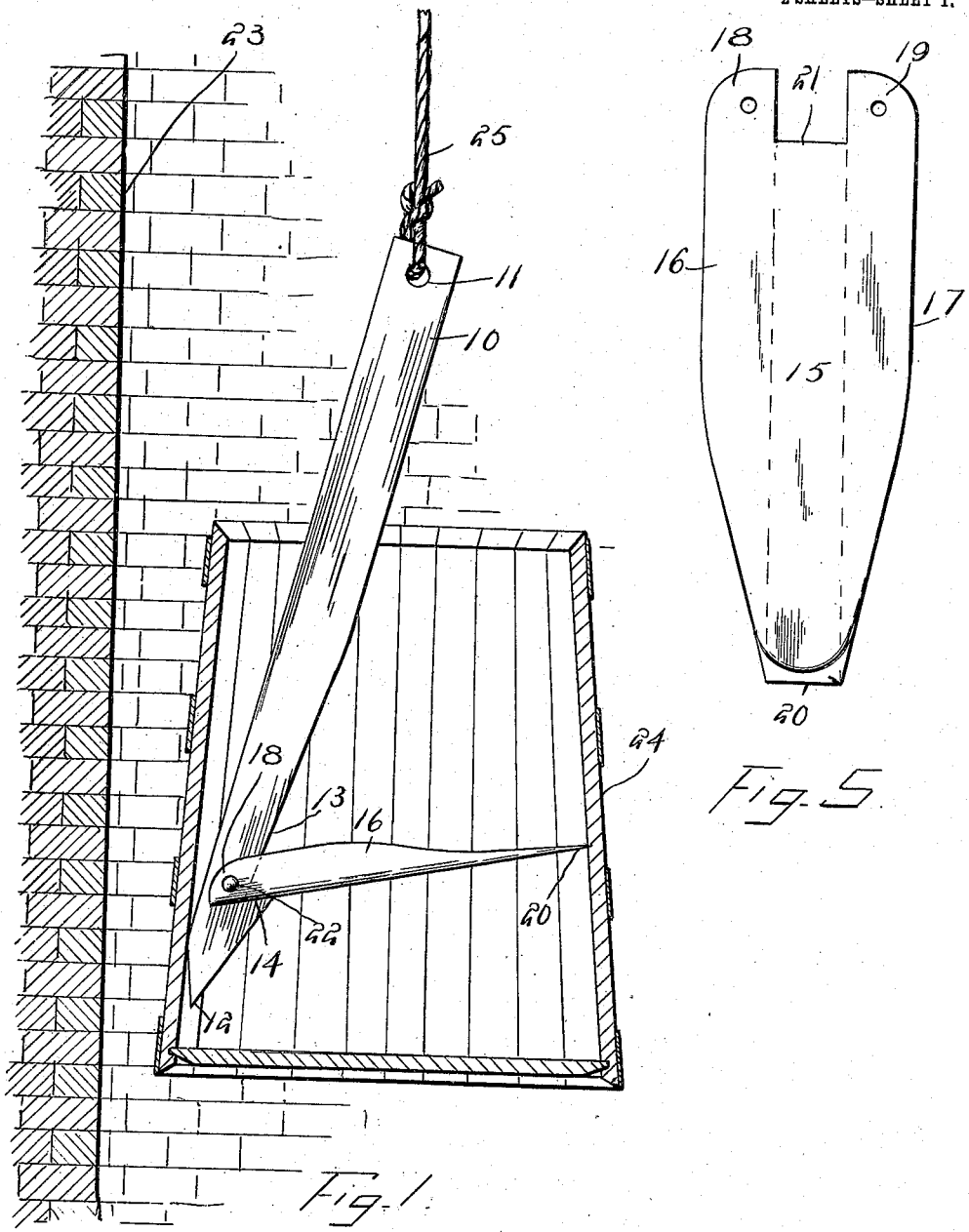

F. M. NAUL.
WELL BUCKET HOOK.
APPLICATION FILED JAN. 6, 1909.

921,146.

Patented May 11, 1909.
2 SHEETS—SHEET 1.

Witnesses
J. C. Simpson
C. N. Woodward

Inventor
Frank M. Naul.
By
Attorneys

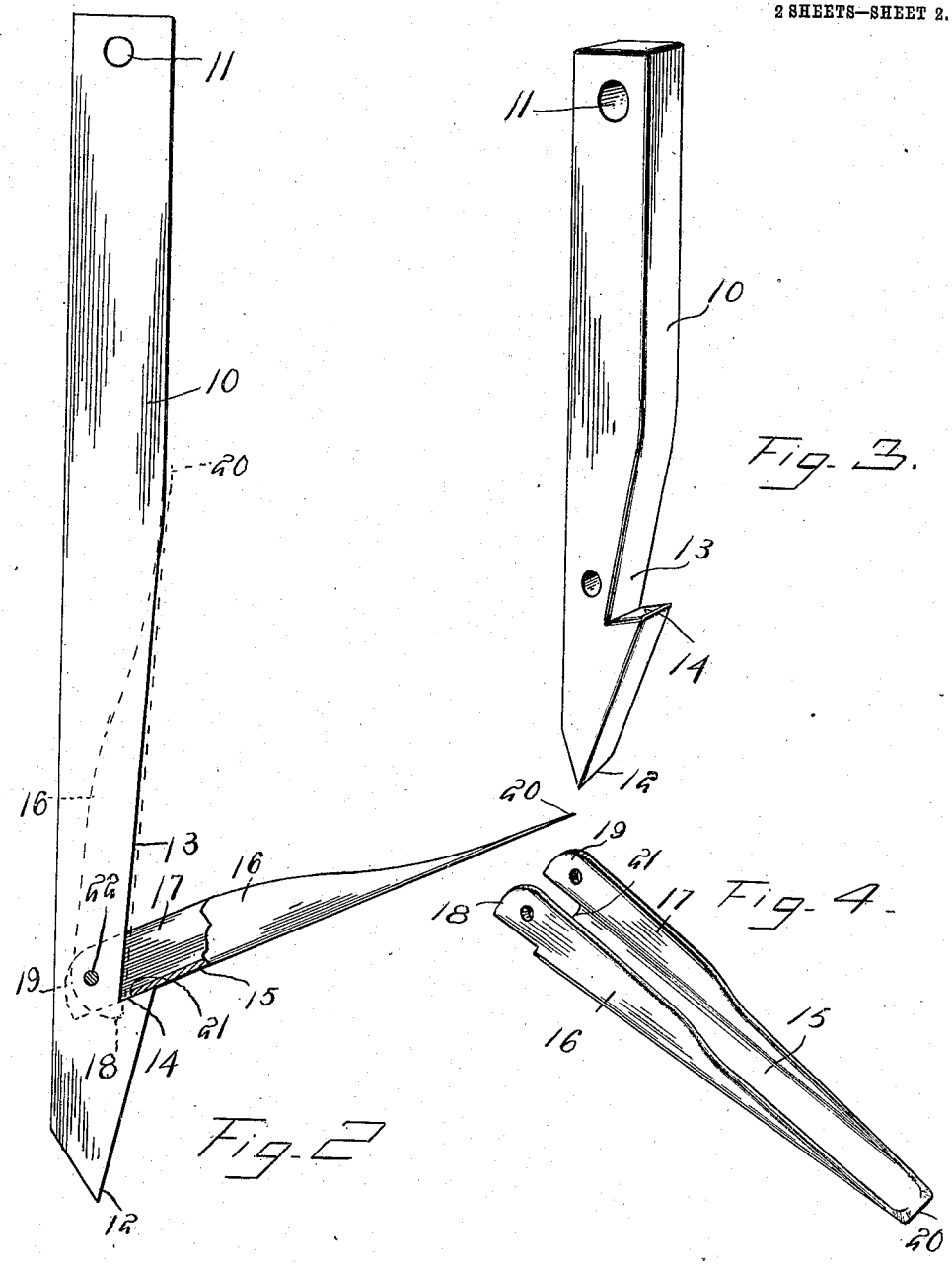

UNITED STATES PATENT OFFICE.

FRANK M. NAUL, OF GRANGEVILLE, LOUISIANA.

WELL-BUCKET HOOK.

No. 921,146.     Specification of Letters Patent.     Patented May 11, 1909.

Application filed January 6, 1909. Serial No. 471,028.

*To all whom it may concern:*

Be it known that I, FRANK M. NAUL, a citizen of the United States, residing at Grangeville, in the parish of St. Helena, State of Louisiana, have invented certain new and useful Improvements in Well-Bucket Hooks; and I do hereby declare the following to be a full, clear, and exact description of the invention, such as will enable others skilled in the art to which it appertains to make and use the same.

This invention relates to devices adapted to grapple or catch buckets in wells from which hoisting cables have been detached, and has for one of its objects to provide a simply constructed implement by which the "lost" bucket may be readily grappled and recovered.

With this and other objects in view the invention consists in certain novel features of construction as hereafter shown and described and then specifically pointed out in the claim, and in the drawings illustrative of the preferred embodiment of the invention, Figure 1 is a sectional view of a portion of a conventional well, with the representation of a bucket and the improved device in operative position. Fig. 2 is an enlarged side view of the improved implement partly in section. Fig. 3 is a perspective view of the stock portion of the device detached. Fig. 4 is a perspective view of the grapple or hook portion of the device detached. Fig. 5 is a representation of the blank from which the hook portion of the device is constructed.

Much annoyance and difficulty is experienced in recovering lost buckets from wells, especially if the bail and other projecting portions are detached, and the improved implement herein shown and described is designed to readily recover such buckets, and the same consists in a stock 10 of any suitable size and of any suitable material, but preferably of metal, and with an aperture 11 at one end to receive the operating cable or rope 25 and pointed at the other end, as shown at 12, and with a lateral recess 13 in one side, the lower end of the recess terminating in an inclined shoulder 14.

A hook or grapple device constitutes a portion of the improved implement and is formed from a single plate of sheet metal, preferably of steel, and formed as shown in Fig. 5, which represents this portion of the device in blank form, but before it is bent into the required shape. The hook device comprises a central portion 15 and spaced sides 16—17, the sides adapted to be bent at right angles to the central portion 15 and extended at one end beyond the central portion to form spaced ears 18—19, and with the outer edges of the sides 16—17 converging toward the terminal 20 of the central portion, the latter preferably sharpened or knife-edged. The hook device is thus formed as shown in Fig. 4, with the sides 16—17 spaced apart equal to the thickness of the stock 10, so that the ears 18—19 may be located at opposite sides of the stock near the shoulder 14 with the terminal 21 of the central portion 15 bearing upon the shoulder.

The hook member is swingingly coupled to the stock by a rivet 22 passing through the ears 18—19 and likewise through the stock, as shown. The recess 13 is relatively long and inclined to the longitudinal plane of the stock, so that when the hook member is disposed in its upward position the sides 16—17 will bear against the opposite sides of the stock, while the central portion 15 will bear against the inclined portion of the recess 13. When the hook member is in its outward position the central portion 15 will be disposed at an angle to the longitudinal plane of the stock and rest by its inner end 21 upon the shoulder, which thus serves as a stop, to limit the downward movement of the hook member.

With an implement thus described when the stock 10 is lowered into the well represented conventionally at 23, and enters the bucket represented at 24, the member 15 will be elevated when it comes in contact with the bucket, so that the implement will freely enter and then the hook member will assume its open position by gravity, and cause the point 20 to engage against one side of the inner surface of the bucket, while the stock 10 engages against the opposite side, as shown in Fig. 1, and then when the pull cable or rope, represented at 25 is operated the implement will be firmly locked to the bucket, and enables the latter to be removed.

The improved implement is simple in construction, can be inexpensively manufactured, and of any required size to adapt it to buckets of various sizes.

What is claimed, is:

A device of the class described comprising a stock having a recess in one side forming a lateral shoulder, a catch device comprising a member bent into U-shape transversely with the sides merging into a flat point at one end and extending into spaced ears at their other ends, said ear portions bearing upon opposite sides of the stock, a pivot extending through said ears and also through the stock, whereby the catch device may be folded against the stock when in one position with its side portions against the sides of the stock and bearing upon and supported by the shoulder when in another position.

In testimony whereof, I affix my signature, in presence of two witnesses.

FRANK M. NAUL.

Witnesses:
J. H. MYERS,
G. M. BRECHEEN.